(12) United States Patent
Jones et al.

(10) Patent No.: US 10,586,206 B2
(45) Date of Patent: Mar. 10, 2020

(54) SYSTEMS AND METHODS FOR MONITORING CONDITIONS ON SHELVES

(71) Applicant: Walmart Apollo, LLC, Bentonville, AR (US)

(72) Inventors: Nicholaus A. Jones, Fayetteville, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/709,116

(22) Filed: Sep. 19, 2017

(65) Prior Publication Data

US 2018/0082245 A1    Mar. 22, 2018

Related U.S. Application Data

(60) Provisional application No. 62/398,223, filed on Sep. 22, 2016.

(51) Int. Cl.
*G06Q 10/08* (2012.01)
*G06F 16/23* (2019.01)
(Continued)

(52) U.S. Cl.
CPC .......... *G06Q 10/087* (2013.01); *G06F 16/23* (2019.01); *H04N 5/23203* (2013.01); *H04N 5/23296* (2013.01); *H04N 7/183* (2013.01)

(58) Field of Classification Search
CPC .............................. G06Q 10/087; G06Q 30/00; G06F 17/30002; G08B 29/00; G08B 19/00; G08B 1/00
See application file for complete search history.

(56) References Cited

U.S. PATENT DOCUMENTS 5,442,343 A * 8/1995 Cato ...................... G06F 3/147
340/10.52
5,471,195 A    11/1995 Rickman
(Continued)

FOREIGN PATENT DOCUMENTS

CN    203091296 U    7/2013
CN    204270349 U    4/2015
(Continued)

OTHER PUBLICATIONS

Girgensohn, Andreas, et al.; "Determining Activity Patterns in Retail Spaces through Video Analysis", Texas A&M University, 2008, pp. 1-4.
(Continued)

*Primary Examiner* — Florian M Zeender
*Assistant Examiner* — Vanessa Deligi
(74) *Attorney, Agent, or Firm* — Fitch, Even, Tabin & Flannery LLP (57) ABSTRACT

Apparatuses and methods are provided useful to monitoring conditions on shelves intended to hold merchandise. There is provided a system for monitoring conditions on shelves including: a shelf for holding merchandise, the shelf being moveable between a first position and a second position; a sound emitter configured to produce a sound in response to movement of the shelf from the first position to the second position; an image sensor configured to capture an image of the interior of the shelf when in the second position; an audio sensor configured to detect the sound indicating the shelf is being moved from the first position to the second position; and a control circuit configured to receive a signal from the audio sensor and to cooperate with the image sensor in response to the signal to capture the image of the shelf when in the second position.

18 Claims, 7 Drawing Sheets

(51) Int. Cl.
*H04N 5/232* (2006.01)
*H04N 7/18* (2006.01)
*H04N 5/247* (2006.01)

(56) References Cited

U.S. PATENT DOCUMENTS

| | | | |
|---|---|---|---|
| 6,341,271 B1 | 1/2002 | Salvo | |
| 7,061,381 B2 | 6/2006 | Forcier | |
| 7,233,241 B2 | 6/2007 | Overhultz | |
| 7,305,467 B2 | 12/2007 | Kaiser | |
| 7,661,545 B2 | 2/2010 | Hardy | |
| 7,676,145 B2 | 3/2010 | Kuberka | |
| 7,777,632 B2 | 8/2010 | Elwell | |
| 7,982,622 B2 | 7/2011 | Burchell | |
| 7,996,256 B1 | 8/2011 | Anand | |
| 8,229,781 B2 | 7/2012 | Zenor | |
| 8,416,299 B2 | 4/2013 | Moore | |
| 8,676,377 B2 | 3/2014 | Siegel | |
| 9,367,831 B1 | 6/2016 | Besehanic | |
| 9,911,290 B1* | 3/2018 | Zalewski | G07G 1/0072 |
| 10,169,660 B1* | 1/2019 | Ren | G06K 9/00771 |
| 2004/0182805 A1* | 9/2004 | Harper | A47B 96/021 211/90.02 |
| 2006/0013070 A1 | 1/2006 | Holm | |
| 2006/0192668 A1* | 8/2006 | Friar | G08B 1/08 340/521 |
| 2007/0033382 A1 | 2/2007 | Mandalia | |
| 2007/0199863 A1* | 8/2007 | Knoettgen-Nap | A47F 3/00 206/730 |
| 2008/0004951 A1 | 1/2008 | Huang | |
| 2008/0077510 A1 | 3/2008 | Dielemans | |
| 2008/0270249 A1* | 10/2008 | Rosenbaum | G06Q 30/02 705/26.1 |
| 2009/0248198 A1* | 10/2009 | Siegel | G06Q 10/08 700/231 |
| 2010/0169189 A1 | 7/2010 | Allison | |
| 2011/0029342 A1 | 2/2011 | Wolinsky | |
| 2011/0055103 A1 | 3/2011 | Swafford, Jr. | |
| 2011/0210084 A1* | 9/2011 | Hardy | A47F 3/002 211/4 |
| 2012/0091162 A1 | 4/2012 | Overhultz | |
| 2012/0295560 A1 | 11/2012 | Mufti | |
| 2013/0090996 A1 | 4/2013 | Stark | |
| 2013/0173435 A1* | 7/2013 | Cozad, Jr. | G06Q 10/087 705/28 |
| 2013/0233922 A1 | 9/2013 | Schoening | |
| 2013/0235206 A1 | 9/2013 | Smith | |
| 2014/0184818 A1 | 7/2014 | Argue | |
| 2014/0201041 A1 | 7/2014 | Meyer | |
| 2014/0313328 A1 | 10/2014 | Park | |
| 2014/0365272 A1 | 12/2014 | Hurewitz | |
| 2014/0365333 A1 | 12/2014 | Hurewitz | |
| 2014/0367401 A1 | 12/2014 | Strålin | |
| 2015/0066497 A1 | 3/2015 | Sun | |
| 2015/0088306 A1 | 3/2015 | Varrasso | |
| 2015/0220764 A1 | 8/2015 | Pudenz | |
| 2015/0262116 A1* | 9/2015 | Katircioglu | G06Q 10/087 705/28 |
| 2015/0365384 A1 | 12/2015 | Rider Jimenez | |
| 2016/0132822 A1* | 5/2016 | Swafford | H04W 4/80 705/28 |
| 2017/0293880 A1 | 10/2017 | Taylor | |
| 2018/0144288 A1 | 5/2018 | Sayed | |

FOREIGN PATENT DOCUMENTS

| | | |
|---|---|---|
| WO | 2003049057 | 6/2003 |
| WO | 2014102797 | 7/2014 |

OTHER PUBLICATIONS

PCT; PCT App. No. PCT/US2017/052617; International Search Report and Written Opinion dated Dec. 1, 2017.
Introducing Smart Shelf. Newave Sensor Solutions. Retrieved from <http://www.newaverfid.com/Portais/0/Resources/NeWave Ss Overview Dec 2015.pdf> on Mar. 13, 2019. Dec. 2015. (Year: 2015).
D'Alessandro, Andrea; "RFID-based smart shelving storage systems"; PhD Thesis University of Pisa; 2014; pp. 1-98.
Happiest Minds; "Smart Shelves for Retail: Redefine your In- Store Experience"; https://www.happiestminds.com/wp-content/uploads/2016/06/Smart-Shelves-for-Retail-Redefine-your-In-Store-Experience.pdf; Jun. 2016; pp. 1-8.
Sharma, Nimita, et al.; "Real-Time Secure Smart Shelf Management for Supermarkets"; International Journal of Advanced Research in Electronics and Communication Engineering (IJARECE); vol. 5, Issue 7; Jul. 2016; pp. 2085-2088.
U.S. Appl. No. 15/395,478; Notice of Allowance dated Jun. 11, 2019; (pp. 1-8).
U.S. Appl. No. 15/395,478; Office Action dated Feb. 11, 2019; (pp. 1-12).

* cited by examiner

SYSTEMS AND METHODS FOR MONITORING CONDITIONS ON SHELVES

CROSS-REFERENCE TO RELATED APPLICATION

This application claims the benefit of U.S. Provisional Application No. 62/398,223, filed Sep. 22, 2016, which is incorporated herein by reference in its entirety.

TECHNICAL FIELD

This invention relates generally to monitoring conditions on shelves, and more particularly, to monitoring conditions on shelves containing merchandise in shopping facilities.

BACKGROUND

One important aspect in the retail setting is the monitoring of inventory and other conditions on shelves. At shopping facilities, the inventory on shelves containing different types of merchandise is monitored to make sure a sufficient quantity of inventory remains on the shelves. When a shelf intended to hold certain merchandise is empty, customers seeking that merchandise may become frustrated and may decide to forego purchase of that merchandise, leading to lost sales.

This monitoring of inventory on shelves may be made more challenging by the nature of the shelves themselves. In some shopping facilities, the shelves may be configured in a stacked arrangement where it may be difficult to see how much merchandise remains on any particular shelf. The shelves may be in the nature of modular shelfs that are moveable between a retracted position for holding merchandise (where the merchandise may not be readily visible) and a pulled out position (where the merchandise on the shelf may be more readily visible). It would be desirable to develop a monitoring system where the shelves are monitored when in the pulled out position.

BRIEF DESCRIPTION OF THE DRAWINGS

Disclosed herein are embodiments of systems, apparatuses and methods pertaining to monitoring condition on shelves containing merchandise. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring conditions on shelves intended to contain merchandise. In some embodiments, there is provided a system for monitoring conditions on shelves in shopping facilities including: a shelf having an interior configured to hold merchandise in a shopping facility, the shelf being moveable between a first position and a second position; a sound emitter operatively coupled to the shelf and configured to produce a predetermined sound in response to movement of the shelf from the first position to the second position; an image sensor configured to capture at least one image of the interior of the shelf when in the second position; at least one audio sensor configured to detect the predetermined sound indicating the shelf is being moved from the first position to the second position and to transmit a signal; and a control circuit operatively coupled to the image sensor and the at least one audio sensor, the control circuit configured to receive the signal from the at least one audio sensor and to cooperate with the image sensor in response to the signal to capture the at least one image of the interior of the shelf when in the second position.

Further, in the system, the shelf may include a bottom surface including at least one of color, grid markings, a ruler, or other indicia indicating the amount of merchandise on the shelf. In addition, in the system, the sound emitter may be configured to emit a predetermined sound having a frequency inaudible to humans. Also, in the system, the sound emitter may be configured to emit a predetermined sound having a specific frequency; and the control circuit may be configured to identify the shelf from a plurality of shelves based on the specific frequency of the sound produced by the sound emitter. Moreover, in the system, the sound emitter may include at least one of a flexible piece of metal, a compressible diaphragm, a speaker, and an air bladder. Further, in the system, the image sensor may include at least one of video cameras, charged-coupled devices, and active-pixel sensors.

In addition, in the system, the at least one audio sensor may include a predetermined array of audio sensors arranged about a predetermined area of the shopping facility, the array of audio sensors arranged to detect the predetermined sound and triangulate the location of the shelf within the shopping facility. Moreover, in the system, the audio sensors may comprise microphones. Also, in the system, the control circuit, in response to receipt of the signal, may be configured to perform at least one of: activate the image sensor to capture the at least one image at or near the time of receipt of the signal; and record the time of receipt of the signal to determine the position of the at least one image from a plurality of images captured by the image sensor. Further, in the system, the control circuit, in response to receipt of the signal, may be configured to determine the location of the shelf and instruct movement of the image sensor to orient on that location.

Also, in the system, the image sensor may be oriented on a plurality of shelves; and the control circuit, in response to receipt of the signal, may be configured to determine the location of the shelf that is in the second position and to determine a region of the at least one image corresponding to that location. Moreover, in the system, the control circuit may be configured to: determine the location of the shelf in the shopping facility based on the predetermined sound detected by the at least one audio sensor; and access a shopping facility geographic database identifying locations of merchandise in the shopping facility to determine the type of merchandise on the shelf. In addition, in the system, the control circuit may be configured to: calculate an amount of merchandise on the shelf based on the at least one image; and access and update an inventory database.

In some embodiments, there is provided a method for monitoring conditions on shelves in shopping facilities including: providing a shelf having an interior configured to hold merchandise in a shopping facility, the shelf being moveable between a first position and a second position; by a sound emitter, producing a predetermined sound in response to movement of the shelf from the first position to the second position; by an image sensor, capturing at least one image of the interior of the shelf when in the second position; by at least one audio sensor, detecting the predetermined sound indicating the shelf is being moved from the first position to the second position and transmitting a signal; and by a control circuit, receiving the signal from the at least one audio sensor and, in response to the signal, cooperating with the image sensor to capture the at least one image of the interior of the shelf when in the second position.

Figure 1:
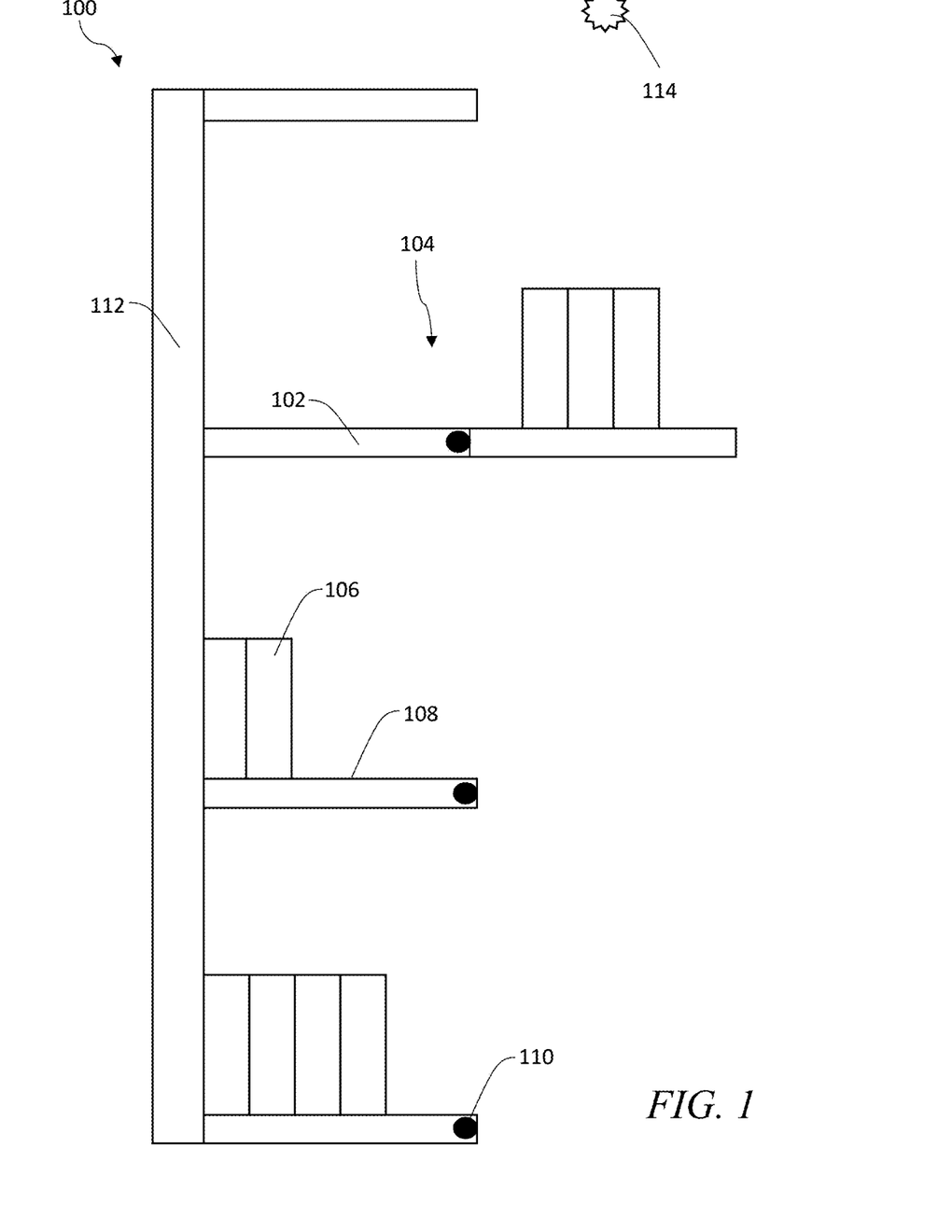
FIG. 1 is a schematic representation in accordance with some embodiments.
Figure 2:
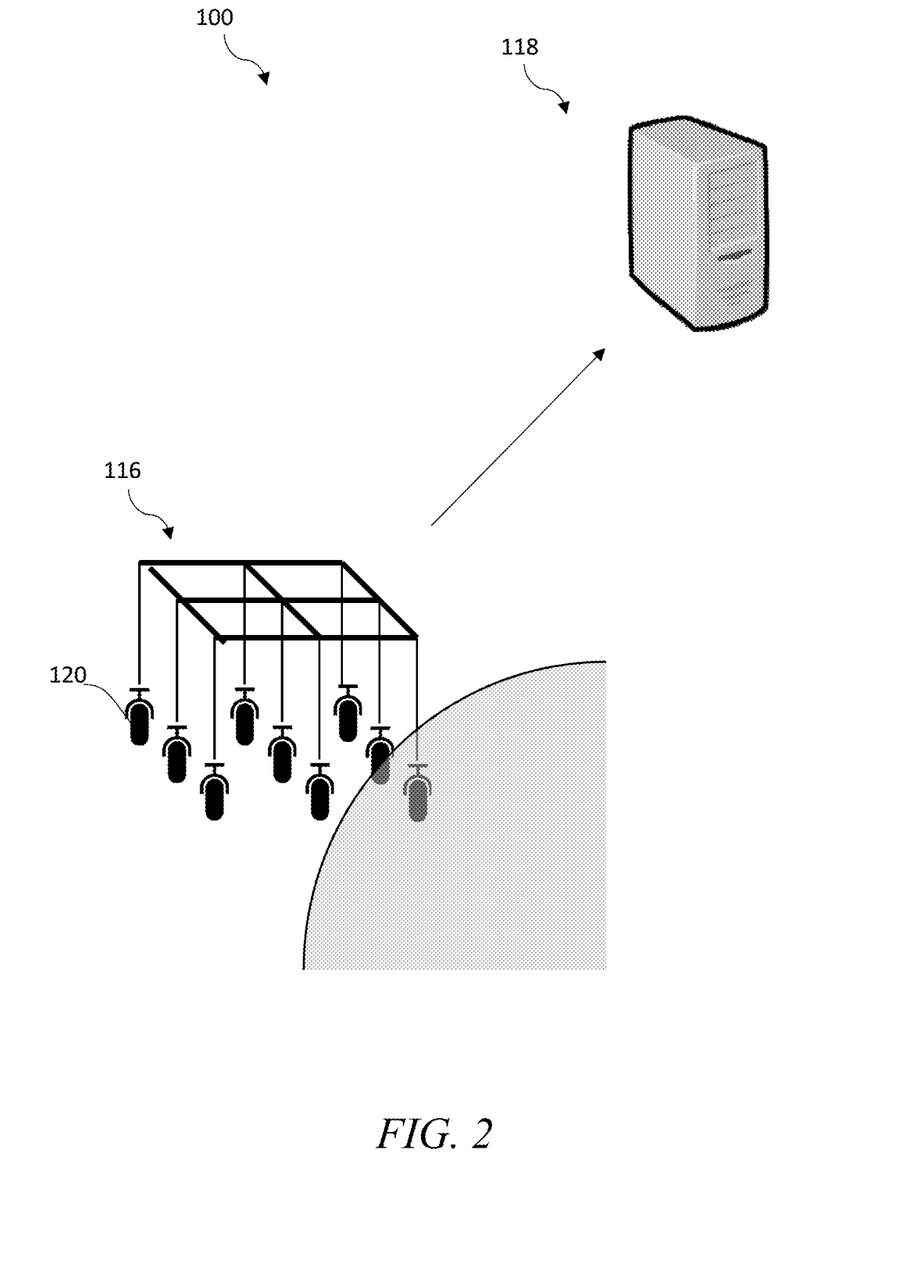
FIG. 2 is a schematic representation in accordance with some embodiments.
Figure 3:
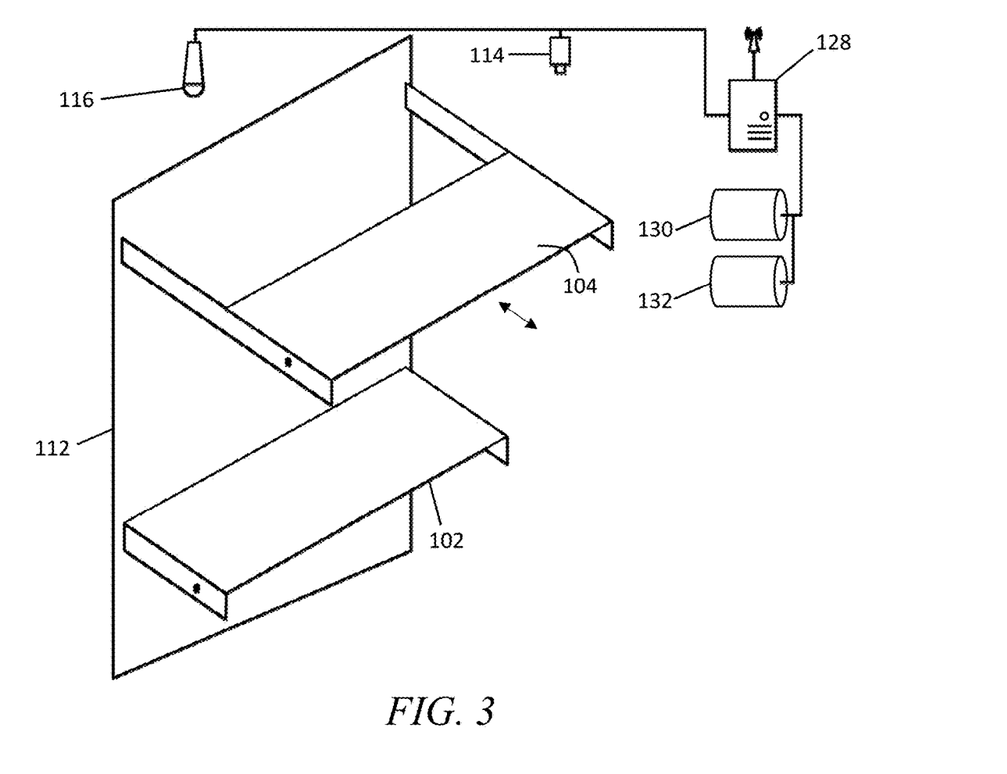
FIG. 3 is a schematic representation in accordance with some embodiments.

FIGS. 1-3 are schematic representations showing a system 100 for monitoring conditions on shelves. In one form, the system 100 is configured to monitor the merchandise and inventory of pull-out shelves at shopping facilities. As addressed further below, the system 100 generally includes a sound emitter that is activated when a shelf is pulled out, which, in turn, is picked up by, at least, one audio sensor. The audio sensor(s) are coupled to a control circuit that activates an image sensor for capturing image(s) of the shelf in the pull-out configuration.

In one form, the system 100 may relate to monitoring pull out shelves for stocking. As addressed further below, the system 100 may include shelves with locking drawer slide assemblies and distributed cameras and microphones. The drawers may be unlocked and pulled out by employees for stocking. When a drawer on a shelf is opened or closed, the shelf may make a distinct sound (e.g., a click) that is detected by the microphones, which then causes the camera system to photograph the items on the shelf before stocking and after stocking is completed. The system 100 may use the captured images to determine: the fullness of the shelf, product placement, proper zoning of the products, and orientation of the products.

As shown in FIG. 1, the system 100 includes a shelf 102 having an interior 104 configured to hold merchandise 106 with the shelf 102 being moveable between a first position and a second position. In one form, the first position may be a retracted position in which the merchandise 106 is displayed and presented for purchase by customers, such as the two bottom shelves shown in FIG. 1. The shelf 102 may lock into place when in this first position or pushed back into this first position. In this form, shelf 102 may slide out from this first position into a second, pulled-out position in which the merchandise 106 may be stocked, rearranged in a first-in first-out pattern, or otherwise handled by a shopping facility employee, such as the top most shelf shown in FIG. 1. It is generally contemplated that any of various types of shelves and shelving arrangements may be used. For example, in one form, the shelving arrangement may be a modular shelving arrangement with the shelving arranged in a vertically stacked manner. Although the shelf 102 is shown in FIG. 1 as being pulled out in a horizontal direction from a first position to a second position, it is further contemplated that the shelf may be moveable in other ways (pushed, lifted, dropped, etc.) and in other directions (vertically, some combination of horizontally and vertically, etc.)

The shelf 102 may also include a bottom surface 108 having visual aids that assist in determining the amount of merchandise 106 on the shelf 102. For example, these visual aids may include color, grid markings, a ruler, and/or other indicia on the bottom surface 108 indicating the amount of merchandise 106 on the shelf 102. If a certain amount of color is visible, this color may indicate that a small amount of merchandise 106 is remaining on the shelf 102. In addition, or alternatively, grid markings may allow a calculation of the amount of merchandise 106 remaining on the shelf 106.

The system 100 also includes a sound emitter 110 operatively coupled to the shelf 102 and configured to produce a predetermined sound in response to movement of the shelf 102 from the first position to the second position. In one form, the sound emitter 110 may produce a mechanical "click" sound when the shelf is extended from the first position to the second position. In FIG. 1, the sound emitter 110 is shown as located at a proximal end of the shelf 102 near the customers when the shelf 102 is in the first position (e.g., retracted position). As the shelf 102 is being pulled out to the second position, the sound emitter 110 generates the predetermined sound and may be located at an intermediate point along the shelf 102 after the shelf 102 has been pulled out to the second position. As should be evident, the sound emitter 110 may be located at various different points along the shelf 102. For example, it may also be located at a distal end of the shelf 102 away from the customers (or at any point between the proximal and distal ends).

The system 100 may generally include any types of sound emitters 110 that are activated when force is applied to shelves to generate a sound inside and/or outside of human audible frequencies. The sound emitter 110 may comprise a device configured to produce a sound in response to any movement of the shelf 102. While the sound emitter 102 is shown to be coupled to a bottom portion of the shelves 102 in FIG. 1, in some embodiments, the sound emitter 110 may be coupled to other parts of the shelves 102, such as to an upper portion, side portion, etc., depending on the specific nature and configuration of the shelves 102. In some embodiments, the shelves 102 may include a plurality of sound emitters 110 coupled to different portions of the shelves 102. In some embodiments, the sound emitters 110 may be configured to produce a sound based on the movement of the shelves 102 relative to a fixed structure, such as the floor, a wall, a pillar, and a divider, and/or another support structure. For example, the sound emitter 110 may be actuated when a gap between two support structures narrows and/or widens. In some embodiments, the sound emitter 110 may be configured to produce a sound based on the movement of an item relative to a support structure. In some embodiments, the sound emitter 110 may be configured to produce different sounds based on the direction of movement of the shelf 102. For example, a first sound may be produced when a forward movement is detected and a second sound may be produced when a backward movement is detected.

In some embodiments, the shopping space includes a plurality of shelves 102 (or shelving units 112) with each shelf 102 or unit 112 having a sound emitter 110 that is configured to make a distinguishable sound. For example, each sound emitter 110 may produce a sound that is distinguishable based on its sound characteristics such as sound frequency, tone, modulation, duration etc. In some embodiments, a sound emitter 110 may produce two or more sound frequencies and be distinguishable based on the combination of frequencies. In some embodiments, the sound emitter 110 may be configured to produce a sound inside the human audible frequency (e.g., 20 to 20,000 Hz) and/or outside of the audible frequency. In some embodiments, the sound emitter 110 may comprise a mechanical device requiring no electricity to produce a sound. In some embodiments, the sound emitter device 108 may comprise an electric sound emitter powered by a power grid, a battery, photovoltaic cells, etc. Several embodiments of the sound emitter device 110 are described in more detail below with reference to FIGS. 6A-10 herein.

In some embodiments, a sound emitter may be configured to produce a sound having a first characteristic when a movement in the first direction is detected and to produce a sound having a second characteristic when a movement in the second direction is detected. For example, a sound emitter may comprise two compressible diaphragms. The first compressible diaphragm may be compressed by a backward motion of the shelf 102 to produce a first sound and the second compressible diaphragm may be compressed by a forward movement of the shelf 102 to produce a second sound. In some embodiments, the system 100 may be configured to determine whether the detected sound is associated with a shelf 102 being closed (e.g., backward motion) or opened (e.g., forward motion) based on the characteristics of the detected sound.

In some embodiments, the system 100 may be configured to determine a shelf 102 (or shelving unit 112) associated with a sound emitter 110 based on one or more of a characteristics of the captured sound and the location of the sound source. In some embodiments, the sound emitters 110 in a shopping space may be configured to produce a sound having distinguishable characteristics such as one or more of frequency, tone, amplitude, modulation, and duration. For example, a sound emitter 110 on a first shelf 102 may produce a sound having a first specific frequency and a sound emitter 110 on a second shelf 102 may produce a sound having a second frequency different from the first frequency. The system 100 may have stored, in a memory, a list of sound characteristic profiles for each sound emitter 110 coupled to a shelf 102 in the shopping space. The system 100 may identify the shelf 102 associated with the captured sound based on comparing the captured sound with the stored sound characteristics profiles of each sound emitter 110.

The system 100 also includes an image sensor 114 configured to capture at least one image of the interior 104 of the shelf 102 when in the second position. In one form, as can be seen in FIG. 1, the interior 104 of the shelf 102 may not be readily visible to the image sensor 110 when in the first position. In this example, the first position may be a retracted position, and some or all of the merchandise 106 on the shelf 102 may be hidden from view by portions of other shelves 102 or support portions of the shelving unit 112. In contrast, in the second position, the shelf has been pulled out, and the interior 104 of the shelf 102 (and the merchandise 106 thereon) is readily visible. In this example, the merchandise 106 is in the line of sight of the image sensor 114, and the image sensor 114 has been positioned so that it has an unobstructed view of the merchandise 106 when the shelf 102 is in the second position.

Any of various types of image sensor 114 may be used. The image sensor 114 may include any type of video camera or optical camera. For example, in one preferred form, the image sensors 114 may include charged-coupled devices, also referred to as CCD camera(s). These digital imaging devices may be selected to be relatively small in size and provide relatively high-quality image data. Alternatively, it is also contemplated that active-pixel sensors (APS) may be used (which include CMOS APS sensors). These sensors generally provide lower quality image data but may be less expensive than CCD sensors and use less power. The image sensors 114 are positioned to be able to view the merchandise 106 on the shelf 102 when in the second position, and an image sensor 114 may be positioned in order to view multiple shelves 102 or shelving units 112.

As shown in FIGS. 2 and 3, the system 100 also includes at least one audio sensor 116 configured to detect the predetermined sound indicating the shelf 102 is being moved from the first position to the second position. In turn, the audio sensor(s) 116 transmit a signal to a control circuit 118. As described in further detail below, the control circuit 118 is configured to receive the signal from the audio sensor(s) 116 and to cooperate with the image sensor 114 to capture image(s) of the interior 104 of the shelf 102 when in the second position.

In one form, the audio sensor(s) 116 may be configured to cooperate with the sound emitters 110 to receive an audio signal within a desired frequency range. It may be desirable to select this frequency range so that the audio signal is generally inaudible to human hearing so as not to disturb customers at the shopping facility. As addressed, the sound emitters 110 may be selected and configured to generate an audio signal having any desired acoustic characteristics, such as frequency, volume, and the like.

In this form, the audio sensor(s) 116 may be in the form of an array of microphones 120, such as shown in FIG. 2. The microphones 120 may be arranged in a desired pattern within a predetermined area of the shopping facility. For example, the microphones 120 may be arranged in a grid-like pattern with each microphone 120 spaced a certain distance from other microphones 120. With this arrangement, it is possible to triangulate the location of the sound emitter 110 (and shelf 102) by determining which specific individual microphones 120 detect the audio signal and the signal strength at these microphones 120. Generally, the accuracy of triangulation will depend on the number and arrangement of the microphones 120. Although this description has involved audio signals and microphones, it should be evident that other types of signals and sensors may be used, such as antennas for receiving RF signals. Further, although one general triangulation approach has been described, any of various existing indoor localization techniques and algorithms may be used and appropriate in certain circumstances (including techniques based on angle of arrival and time of flight). Localization may be accomplished by wired or wireless communication.

In an alternative form, as addressed, the sound emitters 110 may be configured to emit different tones or a different sequence of tones with each unique tone or sequence of tones signifying a different identification code. The acoustic characteristics, such as frequency, volume, and the like, may be varied to signify different shelves 102 (or shelving units 112). Each different identification code may thereby communicate specific information regarding the location of the shelf 102 (or shelving unit 112) within the shopping facility, the product type in the shelf 102 (or shelving unit 112), and/or other desired data.

When a sound is detected by the audio sensor(s), the control circuit 118 receives a signal from the audio sensor(s) 116. The control circuit 118 may be in wired or wireless communication with the audio sensor(s) 116. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 118 may be configured (for example, by using corresponding programming stored in a memory as will be well understood by those skilled in the art) to carry out one or more of the steps, actions, and/or functions described herein.

Figure 4:
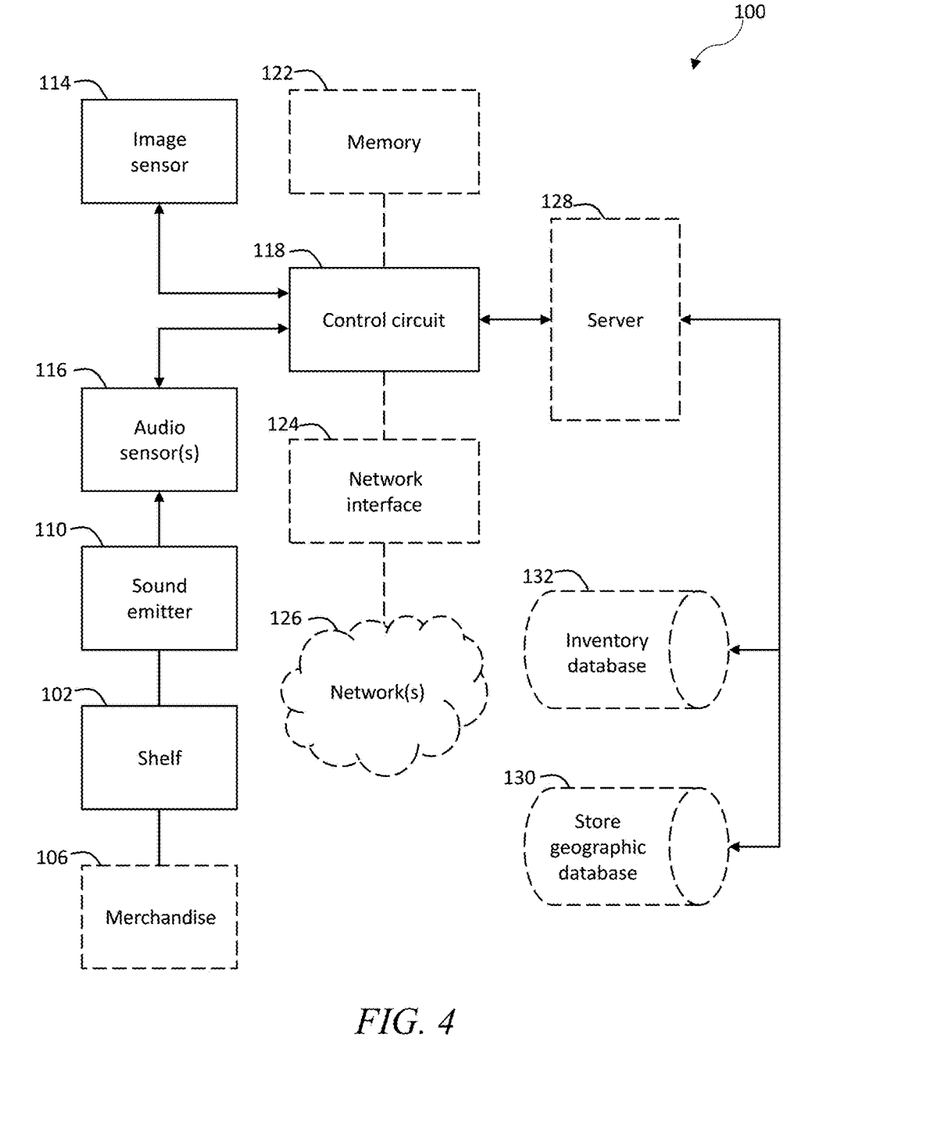
FIG. 4 is a block diagram in accordance with some embodiments.

As shown in FIG. 4, the control circuit 118 may be coupled to a memory 122, a network interface 124, and network(s) 126. The memory 122 can, for example, store non-transitorily computer instructions that cause the control circuit 118 to operate as described herein, when the instructions are executed, as is well known in the art. Further, the network interface 124 may enable the control circuit 118 to communicate with other elements (both internal and external to the system 100). This network interface 124 is well understood in the art. The network interface 124 can communicatively couple the control circuit 118 to whatever network or networks 126 may be appropriate for the circumstances. The control circuit 118 may be in communication with the server 128 of a shopping facility and may make use of cloud databases and/or operate in conjunction with a cloud computing platform.

The control circuit 118 is operatively coupled to and cooperates with the image sensor 114 to capture images of the shelf 102 in the second position. The control circuit 118 may cooperate with the images sensor 114 in various ways. In one form, the control circuit 118, in response to receiving a signal from the audio sensor(s) 116, may be configured to activate the image sensor 114 to capture image(s) at or near the time of receipt of the signal. In this form, it is generally contemplated that the image sensor 114 may be oriented in the general direction of the shelf 102 and may capture images only in response to the control circuit 118 in order to save on image and processing resources. In addition, the control circuit 118 may be configured to record the time of receipt of the signal to determine the position of a specific image or sequence of images from a plurality of images captured by the image sensor 114. This time of receipt may be stored in memory 122 and may help identify and sort images corresponding to specific shelves 102 or shelving units 112.

Alternatively, it is contemplated that the image sensor 114 may be capturing a generally uninterrupted sequence of images over a certain period of time. The image sensor 114 may not be triggered at discrete moments in time to capture a limited number of images when shelves 102 are in the second position. In this form, it is contemplated that the control circuit 118 may record the time of receipt of the signal from the audio sensor(s) corresponding to when shelves 102 are in the second position. Again, these times of receipt may be stored in memory 122 and may allow searching of the sequence of images for the exact time frames and images corresponding to shelves 102 in the second position.

In one form, the control circuit 118, in response to receiving the signal, may be configured to determine the location of the shelf 102 and instruct movement of the image sensor 114 to orient on that location. In this form, it is contemplated that the image sensor 114 is moveable, rather than fixed in position. The image sensor 114 moves so that the shelf 102 corresponding to the sound emitter 110 is in its field of view and the exposed merchandise 106 on the shelf 102 is visible.

In another form, the image sensor 114 may be oriented on a group of shelves 102; and the control circuit 118, in response to receipt of the signal, may be configured to determine the location of the shelf 102 that is in the second position and to determine a region of the at least one image corresponding to that location. In this form, one portion of the image will show the shelf 102 in the pulled-out orientation, and other portions of the image may show other shelves that are in a retracted orientation. So, in this form, it is generally contemplated that the image sensor 116 may be fixed and that the images may need to be analyzed to determine the portion of the image showing the shelf 102 in the second position. Alternatively, the control circuit 118 and the image sensor 116 may be configured to cooperate to cause the image sensor 116 to zoom onto the pulled-out shelf 102 based on the location of the detected sound. It should be understood that both moveable and fixed image sensors 114 are generally contemplated herein.

In one form, it is contemplated that the control circuit 118 may access one or more databases to collect data for performing its functions. It may access these databases through a server 128, and/or the server 128 may be considered to form part of the control circuit 118. For example, the control circuit 118 may be configured to: determine the location of the shelf 102 in the shopping facility based on the sound detected by the audio sensor(s) 116; and access a shopping facility geographic database 130 identifying locations of merchandise 106 in the shopping facility to determine the type of merchandise 106 on the shelf 102. So, for example, the audio sensor(s) 116 may constitute an array of microphones 120 that can triangulate the location of the sound emitter 110 within the shopping facility, and the control circuit 118 may access the geographic database 130 to determine what type of merchandise is at that store location.

The control circuit 118 may be further configured to: calculate an amount of merchandise 106 on the shelf 102 based on the captured image(s); and access and update an inventory database 132. For example, the bottom surface 108 of the shelf 102 may include indicia that may aid in the calculation of the amount of merchandise 106 on the shelf 102. The control circuit 118 may use image analysis techniques to determine the proportion of the shelf 102 that is occupied by merchandise 106 in order to calculate inventory at the shelf 102. It is further contemplated that the control circuit 118 may conduct additional operations involving the inventory database 132, such as triggering the ordering of additional merchandise when the inventory amount in the inventory database 132 falls below a certain level.

Although the system 100 has been described generally in the context of monitoring the amount of merchandise 106 on shelves 102 (inventory), it should be understood that the system 100 may also be used to monitor other conditions on shelves 102. For example, the system 100 may be used to monitor the facing and orientation of the merchandise 106 on shelves 102. In addition, the system 100 may monitor whether incorrect products are on the shelves 102. In one form, the system 100 may use the captured image(s) in conjunction with image recognition comparison (to product images in an image database) to determine if the merchandise is front facing, standing upright, and/or of the correct type of merchandise intended for that particular shelf.

Figure 5:
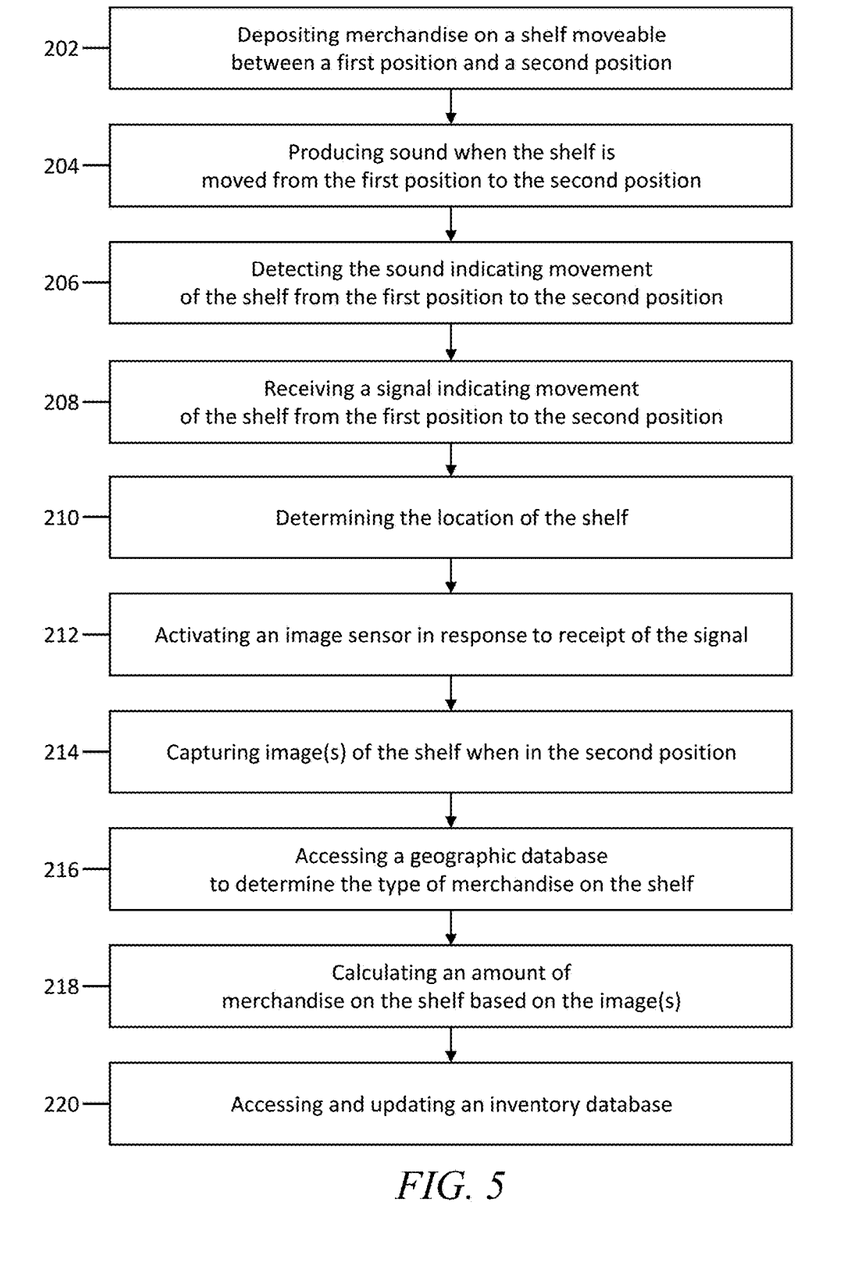
FIG. 5 is a flow diagram in accordance with some embodiments.

Referring to FIG. 5, there is shown a process 200 for monitoring conditions on a shelf in a shopping facility that is intended to hold merchandise. The process 200 may use the system 100 and some or all of the components described above. The process 200 generally makes use of a sound emitter that produces a sound when the shelf is moved from a first position to a second position. This sound is detected by audio sensors, which, in turn, cause a control circuit to activate an image sensor to capture images of the interior of the shelf.

At block 202, merchandise is deposited on a shelf. It is generally contemplated that the shelf may be part of a modular shelving unit at a shopping facility, and the shelf has an interior configured to hold merchandise. Further, it is generally contemplated that the shelf is moveable between a first position (for display and purchase of the merchandise by customers) and a second position (for stocking and other activities by a shopping facility employee). For example, employees may pull out drawers when they are facing the product (bringing product from back to front) and during stocking and during counting of merchandise. In one form, the first position may be a pushed-in, retracted position that is not readily visible from outside the shelf, while the second position may be a pulled-out position that may be more readily visible to an image sensor in the shopping facility. In one form, employees will have deposited (or stocked) merchandise on the shelf.

At block 204, the shelf is moved from the first position to the second position producing a predetermined sound. For example, in one form, this movement may occur due to an employee pulling out the shelf. It is contemplated that any of various types of sound emitters are disposed on, at, or adjacent the shelf so as to produce the sound. For example, these sound emitters may include a flexible piece of metal, a compressible diaphragm, a speaker, and an air bladder. The predetermined sound may have desired auditory characteristics (frequency, volume, etc.), and different types of sounds may be used to identify different shelves or shelving units. The sound may also be tailored so that it is inaudible to human hearing so as not to disturb customers.

At block 206, the sound created by the movement of the shelf is detected as it is moved from the first position to the second position. As addressed above, it is contemplated that this detection may be accomplished in various ways. For example, in one form, the shopping facility may have one or more audio sensor(s) that are equipped to detect a unique sound emitted by each emitter (for example, a unique frequency emitted by each emitter). As another example, the shopping facility may have a number of audio sensors in the form of an array of microphones disposed about certain areas of the shopping facility in a predetermined pattern. In one form, the microphones may be arranged equidistantly in a grid-like pattern with each microphone separated from an adjacent microphone by a certain desired distance. These microphones are configured to detect the sound emitted by the sound emitter.

At block 208, a signal is received indicating movement of the shelf from the first position to the second position. In one form, the audio sensor(s) may transmit one or more signals to a control circuit in response to the detecting the sound emitted by the sound emitter. It is contemplated that the signal(s) may be transmitted by wired or wireless communication.

At block 210, the location of the shelf is determined. This determination may be accomplished in a number of ways. In one form, each sound emitter may be configured to emit a unique sound (for example, each sound emitter may emit a different frequency), and this unique sound may be correlated to a specific shelf/shelving unit location in a memory or database (such as in a shopping facility geographic database). This unique sound can then be used to determine the location by consulting the memory or database. In other words, the sound emitter may emit a predetermined sound having a specific frequency, and the control circuit may identify the shelf from multiple shelves based on the specific frequency of the sound produced by the sound emitter. In another form, involving an array of microphones, the location of the shelf may be determined by using triangulation or other indoor localization techniques. The information regarding the particular microphones that detect the sound and the audio signal strength at each microphone can be used to determine the shelf location. It should be understood that the steps of the process 200 can be performed in a different order than set forth herein.

At block 212, an image sensor is activated in response to the receipt of the signal. It is generally contemplated that the control circuit has received signal(s) from the audio sensor(s) and that the location of the shelf or shelving unit has been determined. The control circuit can activate the image sensor that is directed to the shelf or shelving unit. In one form, it is contemplated that the correspondence between image sensor and shelf/shelving unit location may be stored in a memory or database (such as in a shopping facility geographic database) and may be accessed to determine the appropriate image sensor to be activated. In one form, it is contemplated that the image sensor may be moveable, and the control circuit may determine the location of the shelf and may instruct movement of the image sensor to orient on that location. In another form, it is contemplated that the image sensor may be stationary and may be oriented on multiple shelves such that the shelf constitutes only a portion of the image(s). In this form, the control circuit may determine the location of the shelf that is in the second position and may determine the region of the image(s) corresponding to that location.

At block 214, one or more image(s) may be captured of the shelf in the second position. It is contemplated that various types of image sensors may be used and that the image(s) may be captured in various ways. For example, in one form, the image sensor may be configured so that it does not capture any image(s) until activated by the control circuit. Then, when activated, the image sensor may capture just one image or a small number of images at or near the time of receipt of the signal. In this way, imaging and processing resources may be conserved. In another form, it is contemplated that, during ordinary operation, the image sensor may be capturing a steady sequence of images (video) of the shelf/shelving unit. Then, when the sound is detected, the image sensor will have captured the image(s) of the shelf in the second position, and the time of the sound detection will be recorded. In other words, the control circuit may record the time of receipt of the signal to determine the position of the at least one image from the multiple images captured by the image sensor. In this way, the exact positions of the shelf-in-second-position images in the sequence of images will be known.

At blocks 216, 218, and 220, the information from the captured image(s) may be used. At block 216, the process 200 may make use of a shopping facility geographic database identifying different types of merchandise in the shopping facility and their locations in the shopping facility, i.e., what merchandise is on which shelves. This database may be accessed to identifying the specific type of merchandise at the shelf corresponding to the emitted sound. At block 218, an amount of merchandise on the shelf may be calculated based on the image(s). For example, the control circuit may use image recognition techniques to count the merchandise items on the shelf or to determine a proportion of the shelf that is occupied (or unoccupied) by merchandise. The control circuit may then use this information to calculate an amount of merchandise on the shelf. At block 220, an inventory database may be accessed and updated. The inventory database may include one or more fields that include amounts of a certain type of merchandise located at different areas in the shopping facility. By adjusting these fields, the inventory for the entire shopping facility may then be updated.

Although the process 200 has been described generally in the context of monitoring the amount of merchandise on shelves, it should be understood that the process 200 may also be used to monitor other conditions on shelves. For example, the process 200 may be used to monitor the facing and orientation of the merchandise on shelves and the types of products placed on the shelves. In one form, the process 200 may compare the captured image(s) using image recognition software to product images in an image database to determine if the merchandise is front facing, standing upright, and/or of the correct type of merchandise intended for that particular shelf.

Figure 6A:
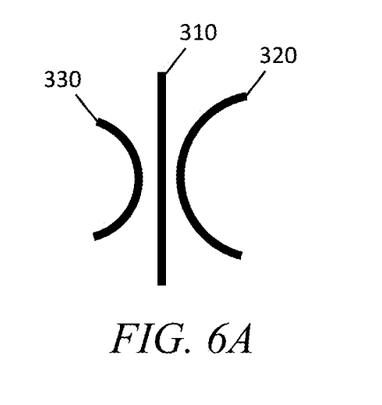
FIGS. 6A, 6B, 6C, 7A, 7B, 8A, 8B, 9A, 9B and 10 are illustrations of several sound emitters in accordance with some embodiments.

Next referring to FIGS. 6A-10, illustrations of several embodiments of sound emitter devices are shown. In FIGS. 6A-C, a sound emitter comprising a pair of diaphragms is shown. The sound emitter includes a first diaphragm 330, a second diaphragm 320, and an actuator 310. The actuator 310 may be part of the sound emitter device coupled to a shelf 102. The first diaphragm 330 and the second diaphragm 320 may each comprise a semi-flexible material that maintains a first state when no force is applied, and may be compressed to produce a sound when a force is applied. In some embodiments, the first diaphragm 330 and the second diaphragm 320 may comprise one or more of metal, rubber, plastic, silicon, etc. In some embodiments, each diaphragm may be made to produce a distinguishable sound. For example, the characteristics (e.g., frequency, tone, modulation, duration, etc.) of the sound produced by the compression of a diaphragm may be varied based on varying one or more of the diameter, material thickness, curvature, shape, etc. of the diaphragm. One or more audio sensor(s) may then determine the movement direction of the actuator 310 based on determining whether a detected sound is produced by the first diaphragm 330 or second diaphragm 320.

Figure 6B:
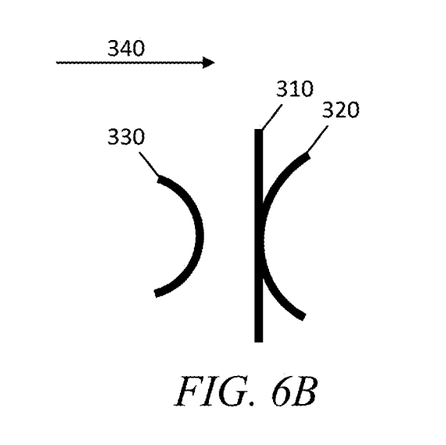
Figure 6C:
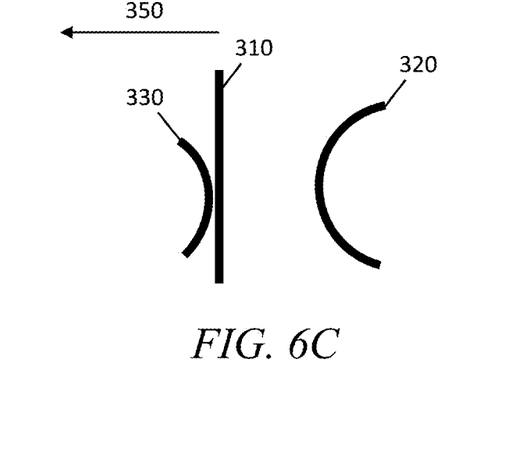

In FIG. 6A, the actuator 310 is in a neutral state in which no detectable force is applied in either direction. In FIG. 6B, a force 340 is applied in a backward direction to cause the actuator 310 to compress the second diaphragm 320. The actuator 310 may be actuated by movement of the shelf 102 in one direction. In some embodiments, after the force 340 is removed, the actuator 310 may return to the neutral state shown in FIG. 6A. In FIG. 6C, a force 350 is applied in a forward direction to cause the actuator 310 to compress the first diaphragm 330. The force 340 may be caused by movement of the shelf 102 in the opposite direction. In some embodiments, after the force 350 is removed, the actuator 310 may return to the neutral state shown in FIG. 6A. In some embodiments, the actuator 310 may be coupled to one or more springs configured to return the actuator 310 back to the neutral state in the absence of detectable force. In some embodiments, the first diaphragm 330 and/or the second diaphragm 320 may also produce a sound when the diaphragm returns from a compressed state to a neutral state. In some embodiments, the control circuit 118 and/or audio sensor(s) 116 may distinguish between the first diaphragm 330 and the second diaphragm 320 and other diaphragms attached to other shelves based on the sound produced during compression or decompression of the diaphragm.

Figure 7A:
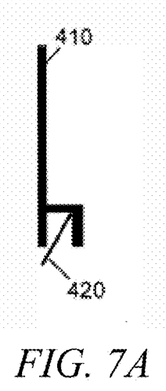
Figure 7B:
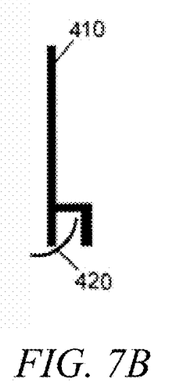

Next referring to FIGS. 7A-B, a sound emitter device comprising a bendable foil is shown. The sound emitter device includes a foil 420 and an actuator 410. The actuator 410 may be part of the sound emitter device coupled to a shelf 102. In some embodiments, the foil 420 may comprise a semi-flexible material that maintains a first state when no force is applied, and may be bend to produce a sound when a force is applied. In some embodiments, the foil 420 may comprise one or more of metal, rubber, plastic, silicon, etc. In some embodiments, the foil 420 may be made to produce a distinguishable sound. For example, the characteristics of the sound produced by the compression of a foil may be varied based on varying one or more of the foil's shape, size, material thickness, etc. The control circuit 118 and/or audio sensor(s) 116 may then distinguish foils coupled to different shelves based on their sound characteristics. In some embodiments, the foil 420 may be configured to produce a second sound when it returns from a bent state to a neutral state. When an item is placed on a support structure and a backward force and/or downward is applied to the actuator 410, in FIG. 7B, the foil 420 may bend to produce a sound. In some embodiments, a sound emitter may include a second foil that may be actuated by an actuator in the opposite direction of movement.

Figure 8A:
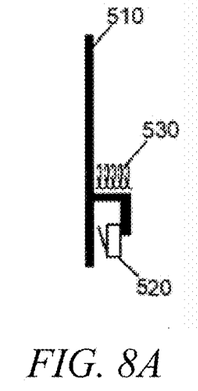
Figure 8B:
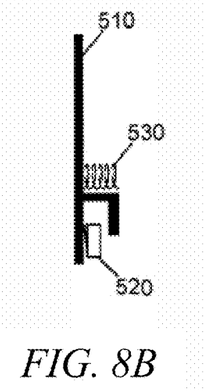

Next referring to FIGS. 8A-B, a sound emitter device comprising a clicker is shown. The sound emitter device includes a clicker 520, an actuator 510, and a spring 530. The actuator 510 may be part of the sound emitter device coupled to a shelf 102. In some embodiments, the clicker 520 may include a lever that strikes a sound element. In some embodiments, the clicker 520 may be configured to produce a distinguishable sound. For example, the characteristics of the sound produced by the clicker 520 may be varied based on varying one or more of the size, shape, and thickness of the lever and/or the sound element of the clicker 520. The control circuit 118 and/or audio sensor(s) 116 may then distinguish clickers coupled to different support structures based on their respective sound characteristics. When a backward force and/or downward is applied to the actuator 510, in FIG. 8B, the clicker 520 may be actuated to produce a sound. In some embodiments, the clicker 520 may be coupled to a structure that remains generally fixed relative to the shelf 102.

Figure 9A:
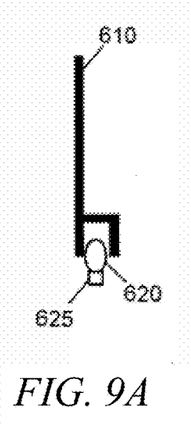
Figure 9B:
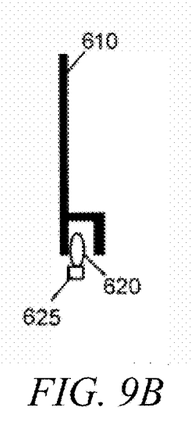

Next referring to FIGS. 9A-B, a sound emitter device comprising an airbladder is shown. The sound emitter device includes an airbladder 620, a two way air valve 625, and an actuator 610. The actuator 610 may be part of the sound emitter device coupled to a shelf 102. In some embodiments, the airbladder 620 may be configured to be compressed by the actuator 610 to push air through the two way air valve 625. The two way air valve 625 may produce a first sound when air leaves the airbladder 620 and a second sound when air enters the airbladder. In some embodiments, the two way air valve 625 may be configured to produce distinguishable sounds. For example, the characteristics of the sound produced by the two way air valve 625 may be varied based on varying one or more of the size and shape of the airbladder 620 and the one or more openings of the two way air valve 625. The control circuit 118 and/or audio sensor(s) 116 may distinguish airbladders and air valves coupled to different support structures based on their sound characteristics. When a backward force and/or downward force is applied to the actuator 610, in FIG. 6B, the airbladder 620 may be compressed to produce a sound through the two way air valve 625. As the airbladder 620 expands, air may pass through the two way air valve 625 to produce a second sound detectable by the audio sensor(s).

Figure 10:
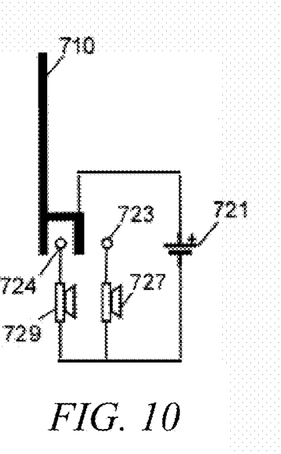

Although mechanical sound emitters 110 are preferably used, the system 100 and process 200 may also utilize electrical sound emitters 110. Referring to FIG. 10, a sound emitter device comprising electrical speaker devices is shown. The sound emitter comprises an actuator 710, two contacts 724 and 723, two speakers 729 and 727 each coupled to a contact, and a power source 721. The actuator 710 may comprise one or more contacts that are coupled to the power source 721 and configured to contact the contacts 724 and 723. The actuator 710 may be actuated by movement of the shelf 102. When a backward force is applied to the actuator 710, the actuator 710 contacts the contact 723 and closes the circuit to power the speaker 727 to produce a sound. When a forward force is applied to the actuator 710, the actuator 710 contacts the contact 724 and closes the circuit to power the speaker 727 to produce a sound. The speakers 727 and 729 may generally be any device configured to produce a sound when power is supplied to it. In some embodiments, each speaker may be configured to produce a distinguishable sound such that the audio sensor(s) may determine the direction of the force applied to the shelf 102 based on the sound characteristics of a detected sound. In some embodiments, a powered sound emitter device may comprise a single speaker coupled to the contacts 724 and 723 via different resistance such that the sound produced when the actuator 710 contacts each contact varies due to the difference in resistance. The power source 721 may be one or more of a battery, a photovoltaic cell, and a power line. In some embodiments, the sound emitter may be powered by wireless power harvesting.

FIGS. 6A-10 are provided as examples of a sound emitter device according to some embodiments only. While actuators in FIGS. 6A-10 are generally shown to apply a horizontal force, in some embodiments, the actuators may apply a downward force depending on the arrangement and movement of the shelves. In some embodiments, a sound emitter device may generally be any device configured to emit a sound, having a frequency audible or inaudible to humans, based on the movement of the shelves.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for capturing images of merchandise items on moveable shelves in shopping facilities comprising:
a plurality of shelves, each shelf having an interior configured to hold merchandise in a shopping facility, each shelf being moveable between a first position and a second position;
a plurality of sound emitters disposed at the plurality of shelves in the shopping facility, each sound emitter being configured to emit a different predetermined sound having a specific frequency at a corresponding shelf;
each sound emitter operatively coupled to the corresponding shelf and configured to produce a predetermined sound in response to movement of the corresponding shelf from the first position to the second position;
an image sensor configured to capture at least one image of merchandise in the interior of a shelf being moved when the shelf being moved is in the second position;
at least one audio sensor configured to detect the predetermined sound from the sound emitter indicating the shelf is being moved from the first position to the second position and to transmit a signal, the at least one audio sensor being operatively coupled to actuate the image sensor to capture the at least one image when the predetermined sound from the sound emitter is detected; and
a control circuit operatively coupled to the image sensor and the at least one audio sensor, the control circuit configured to receive the signal from the at least one audio sensor and to cooperate with the image sensor in response to the signal to capture the at least one image of merchandise in the interior of the shelf being moved when in the second position;
wherein the control circuit, in response to receipt of the signal, is configured to determine the location of the shelf being moved in the shopping facility and instruct movement of the image sensor to orient on merchandise in the interior of the shelf being moved when in the second position;
wherein the control circuit is configured to identify the location of the shelf being moved from the plurality of shelves in the shopping facility based on the specific frequency of the sound produced by the sound emitter at the shelf being moved.

2. The system of claim 1, wherein at least one shelf includes a bottom surface including at least one of color, grid markings, a ruler, or other indicia indicating the amount of merchandise on the shelf.

3. The system of claim 1, wherein at least one sound emitter is configured to emit a predetermined sound having a frequency inaudible to humans.

4. The system of claim 1, wherein at least one sound emitter comprises at least one of a flexible piece of metal, a compressible diaphragm, a speaker, and an air bladder.

5. The system of claim 1, wherein the image sensor comprises at least one of video cameras, charged-coupled devices, and active-pixel sensors.

6. The system of claim 1, wherein the at least one audio sensor comprises a predetermined array of audio sensors arranged about a predetermined area of the shopping facility, the array of audio sensors arranged to detect the predetermined sound and triangulate the location of the shelf being moved within the shopping facility.

7. The system of claim 6, wherein the audio sensors comprise microphones.

8. The system of claim 1, wherein the control circuit, in response to receipt of the signal, is configured to:
activate the image sensor to capture the at least one image at or near the time of receipt of the signal, the image sensor being in an inoperative condition and not capturing images until receipt of the signal.

9. The system of claim 1, wherein:
the image sensor is oriented on two or more shelves to capture images of all of the two or more shelves at the same time; and
the control circuit, in response to receipt of the signal, is configured to determine the location of the shelf being moved that is in the second position and to determine a region within the at least one image corresponding to that location.

10. The system of claim 1, wherein the control circuit is configured to:
determine the location of the shelf being moved in the shopping facility based on the predetermined sound detected by the at least one audio sensor; and
access a shopping facility geographic database identifying locations of merchandise in the shopping facility to determine the type of merchandise on the shelf being moved.

11. The system of claim 10, wherein the control circuit is configured to:
calculate an amount of merchandise on the shelf being moved based on the at least one image; and
access and update an inventory database.

12. A method of capturing images of merchandise items on moveable shelves in shopping facilities comprising:
providing a plurality of shelves, each shelf having an interior configured to hold merchandise in a shopping facility, each shelf being moveable between a first position and a second position;
providing a plurality of sound emitters disposed at the plurality of shelves in the shopping facility, each sound emitter being configured to emit a different predetermined sound having a specific frequency at a corresponding shelf;
by each sound emitter, producing a predetermined sound in response to movement of the corresponding shelf from the first position to the second position;
by an image sensor, capturing at least one image of merchandise in the interior of a shelf being moved when shelf being moved is in the second position;
by at least one audio sensor, detecting the predetermined sound from the sound emitter indicating the shelf is being moved from the first position to the second position and transmitting a signal, the at least one audio sensor being operatively coupled to actuate the image sensor to capture the at least one image when the predetermined sound from the sound emitter is detected;
by one of the plurality of sound emitters, emitting a predetermined sound having a specific frequency; and
by a control circuit, receiving the signal from the at least one audio sensor and, in response to the signal, cooperating with the image sensor to capture the at least one image of merchandise in the interior of the shelf being moved when in the second position; and
by the control circuit, determining the location of the shelf being moved in the shopping facility and instructing movement of the image sensor to orient on merchandise in the interior of the shelf being moved when in the second positions;
by the control circuit, identifying the location of the shelf being moved from the plurality of shelves in the shopping facility based on the specific frequency of the sound produced by the sound emitter at the shelf being moved.

13. The method of claim 12, further comprising, by the control circuit:
activating the image sensor to capture the at least one image at or near the time of receipt of the signal, the image sensor being in an inoperative condition and not capturing images until receipt of the signal.

14. The method of claim 12, wherein the image sensor is oriented on two or more shelves to capture images of all of the two or more shelves at the same time, the method further comprising, by the control circuit:
determining the location of the shelf being moved that is in the second position and determining a region within the at least one image corresponding to that location.

15. The method of claim 12, further comprising, by the control circuit:
determining the location of the shelf being moved in the shopping facility based on the predetermined sound detected by the at least one audio sensor; and
accessing a shopping facility geographic database identifying locations of merchandise in the shopping facility to determine the type of merchandise on the shelf being moved.

16. The method of claim 12, further comprising, by the control circuit:
calculating an amount of merchandise on the shelf being moved based on the at least one image; and
accessing and updating an inventory database.

17. The system of claim 1, wherein the control circuit, in response to receipt of the signal, is configured to record the time of receipt of the signal to determine the position of the at least one image within a sequence of images captured by the image sensor, the image sensor being in an operative condition and capturing images prior to and after receipt of the signal.

18. The method of claim 12, further comprising, by the control circuit, recording the time of receipt of the signal to determine the position of the at least one image from a plurality of images captured by the image sensor, the image sensor being in an operative condition and capturing images prior to and after receipt of the signal.

\* \* \* \* \*

UNITED STATES PATENT AND TRADEMARK OFFICE
CERTIFICATE OF CORRECTION

PATENT NO. : 10,586,206 B2
APPLICATION NO. : 15/709116
DATED : March 10, 2020
INVENTOR(S) : Nicholaus A. Jones et al.

Page 1 of 1

It is certified that error appears in the above-identified patent and that said Letters Patent is hereby corrected as shown below:

In the Claims

Column 16, Line 8, Claim 12, delete "positions;" and insert -- position; --, therefor.

Signed and Sealed this
Eleventh Day of August, 2020

Andrei Iancu
*Director of the United States Patent and Trademark Office*